May 3, 1955

C. H. CHRISTENSEN 2,707,331

COMPUTING GUN SIGHT

Filed July 10, 1946

Inventor
Carl H. Christensen
By J. H. Church & H. E. Thibodeau
Attorney

May 3, 1955 — C. H. CHRISTENSEN — 2,707,331
COMPUTING GUN SIGHT
Filed July 10, 1946 — 6 Sheets-Sheet 3

Inventor
Carl H. Christensen
By J. H. Church & H. E. Thibodeau
Attorney

May 3, 1955

C. H. CHRISTENSEN 2,707,331

COMPUTING GUN SIGHT

Filed July 10, 1946

Inventor

Carl H. Christensen

By J. H. Church & H. E. Thibodeau
Attorney

UNITED STATES PATENT OFFICE 2,707,331
Patented May 3, 1955

2,707,331

COMPUTING GUN SIGHT

Carl H. Christensen, Salt Lake City, Utah

Application July 10, 1946, Serial No. 682,519

20 Claims. (Cl. 33—49)

(Granted under Title 35, U. S. Code (1952), sec. 266)

The invention described herein may be manufactured and used by or for the Government for governmental purposes, without the payment to me of any royalty thereon.

This invention relates to a computing sight for firing at moving targets. In such firing, it is necessary to make allowance for the travel of the target during the time the projectile travels from the gun to the target. The general purpose is, as in all devices of a similar type, to determine the speed and range of the target and, from such values, to compute the time required from the projectile to pass from the gun to the target. Then, assuming that the target will maintain its course and speed unchanged during the aforesaid time, to compute the lead angle subtended at the gun by a distance equal to the product of said time and the target speed, along the path of the target from the present position thereof, as well as the direction relatively to the instantaneous gun-target line. Having thus determined the lead angle, the final step is to angularly move the gun in train or elevation, or both, relatively to the gun-target line through the aforesaid lead angle so that the gun points to a position in advance of the target, and to maintain it at such angle while the sights are maintained directed upon the target. The gun-target line and its angular rate of movement about the gun as a center, may be determined by direct sighting, sound locators, radar, or any other known means.

More specifically, it is an object of the invention to provide a sight that enables firing upon a moving target in a manner similar to regular artillery engagement of a stationary target.

Another object is to provide a computing on-carriage sight that may be optionally operated by one or two men as a computing system, or by one or two men as an estimating and spot-correction system.

Another object is to provide a computing sight that is wholly self-contained, requiring no external source of power for operation.

A further object is to provide a computing sight that will operate steadily for all rates of traversing whether or not the traversing motion is introduced smoothly, so long as certain limiting conditions are satisfied, as will be subsequently explained.

Another object is to provide a method of aiming a gun that is free from the effects of tracking errors except at the beginning and completion of a predetermined tracking period.

Still another object is to provide a computing sight that requires but a minimum of alterations of existing weapons, for installation and operation in conjunction therewith.

A still further object is to provide a computing sight which bases its output predictions upon the angle subtended at the gun by the total travel of the target during a fixed predetermined time interval, such as four seconds, whereby future target position is correctly predicted so long as the gun-target line is correctly determined at the beginning and termination of the aforesaid interval.

Other objects of the invention are to provide a novel mount for an on-carriage computing sight whereby the sight may be automatically returned to initial or zero deflector position, easily and accurately cross-leveled to correct for trunnion tilt, and easily adjusted to effect spot corrections.

Other objects of the invention will become apparent as the description proceeds and include (a) the avoidance of target ambiguity by the use of interconnected trainer's and pointer's telescopes, (b) a sight in which the possibility of injury to operating personnel by sight jump, recoil, etc., is remote, (c) a computer, that, when disconnected, automatically leaves the sight in bore sighted relation with the gun so that stationary and moving targets may be alternatively and selectively engaged, (d) the provision of a sight that is easy to operate, rapid and accurate in response to proper actuation and that renders any gun to which it is attached, more versatile in use and more effective over a wider range of targets, than the same weapon without my invention.

Theory of operation

Figure 1:
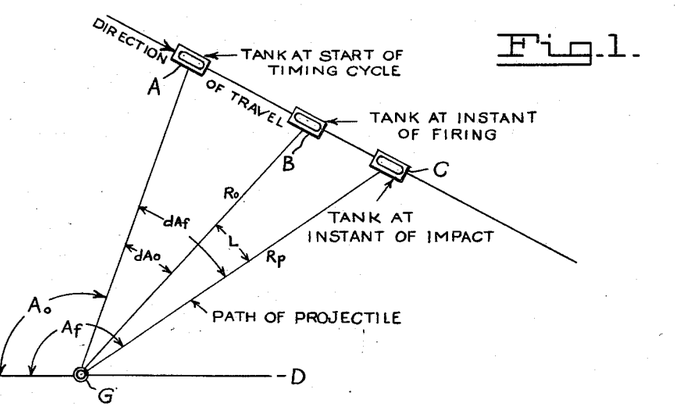
Figure 1 is a diagrammatic view showing the geometrical principles involved in the operation of the sight, all lines and angles lying in a plane determined by the gun and target path.

Referring to Figure 1, let G represent the position of a gun equipped with the invention; A, the position of a horizontally moving target, such as a tank at the beginning of a fixed predetermined timing cycle or period; B, the position of the tank at the end of said cycle and instant of firing; and C, the position of the tank at the instant of impact of the projectile. Let $A_0$ equal the present azimuth angle of the target measured from any arbitrarily-selected line, such as GD; $dA_0$, the change in azimuth angle measured at the gun during the predetermined period; $A_f$, the azimuth angle of the gun at the instant of firing; $dA_f$, the total angular movement of the gun in azimuth from the start of the timing period; L, the lateral lead angle; and $t$, the time of flight of the projectile from G to C. Also let $A_0'$ equal the present angular velocity of the target about the vertical through the gun position, $R_0$ the present range, and $R_p$, the predicted range.

For the relatively small values of L encountered in firing at surface vehicles, such as tanks, the length of a perpendicular dropped from C to GB, extended if necessary, will vary closely equal the length $l$, of the arc of radius $R_0$, intercepted between GB and GC, or $l = R_0 L$; $L = A_0' t$; and $l = R_0 A' t$ Then $$\sin L = A_0' t \frac{R_0}{R_p} \quad (1)$$

Furthermore, under the conditions of fire for which the sight is intended there is practically no difference between $R_0$ and $R_p$ nor between the angle L and its sine during the time of flight of the projectile so that the ratio $R_0/R_p$ can be taken as unity and L substituted for sine L, without appreciable error. Making these substitutions in (1), $$L = A_0' t \quad (2)$$

The time period selected may vary with conditions of use for which the instrument is intended. I have found a 4-second interval to give satisfactory results and the description will be based upon a sight using that interval. The value of $A_0'$, then, is taken as the average change of azimuth of the target per second, so that, in the present instrument, $$A_0' = \frac{dA_0}{4} \quad (3)$$

Substituting the value of (3) in (2).

$$L = \frac{dA_0 t}{4} \quad (4)$$

At the beginning of a computing cycle or observation, for example, when the target is at A, Figure 1, the gun and telescopes lie in parallel vertical planes. At the instant of firing, the gun must have advanced ahead of the telescope or other "sighting" device by the angle L. In this instrument, then, the gun must move during a four-second period, through a dihedral angle measured in a horizontal plane, equal to $dA_f = dA_0 + L$. Since the traversing motion of the gun is the one actually introduced into, and utilized by, the computer, the change in azimuth of the gun is substituted in (4). In short, the computer base moves with the gun through the angle $dA_f$, while the sight case itself moves backwardly relatively to the gun, through the angle L. Hence in the instrument selected for illustration, using a four-second period $$\frac{t}{t+4}$$

is used instead of $t$. Effecting the foregoing substitutions in (4)

$$L = \frac{dA_f t}{t+4} \quad (5)$$

which is the basic equation utilized by the instrument.

*The gun and sight mount*

Figure 2:
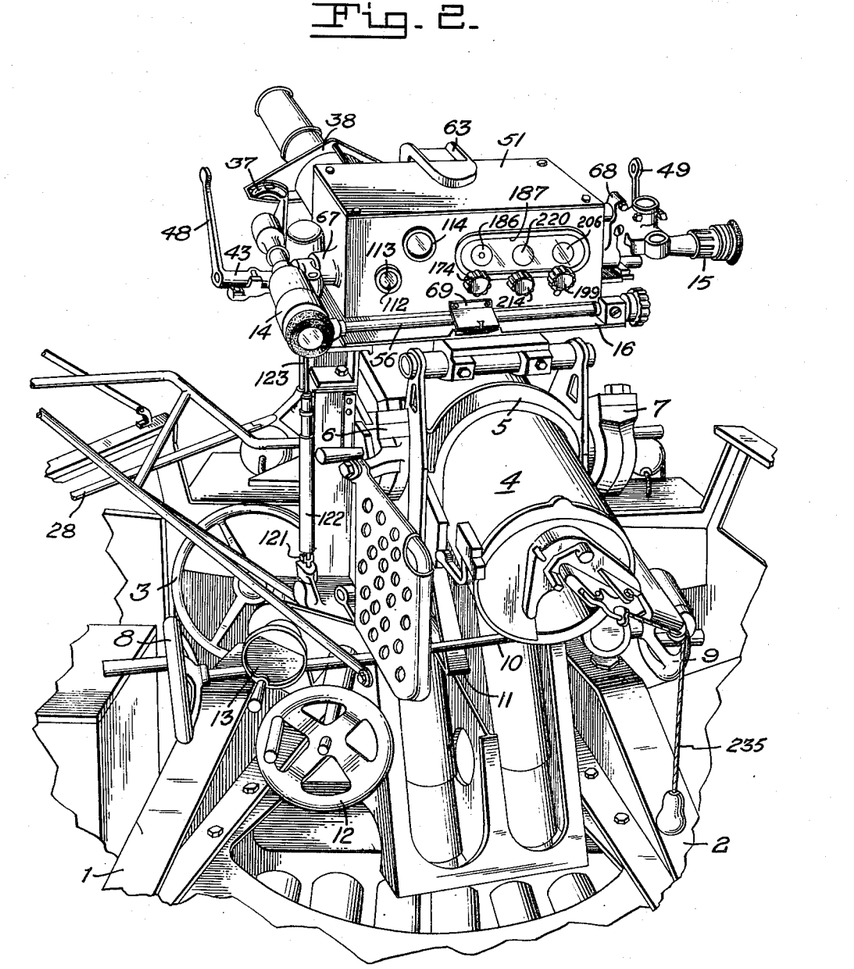
Figure 2 is a perspective view of a standard 75 mm. gun mounted upon an automotive carriage and equipped with the sight forming the subject matter of the invention.
Figure 3:
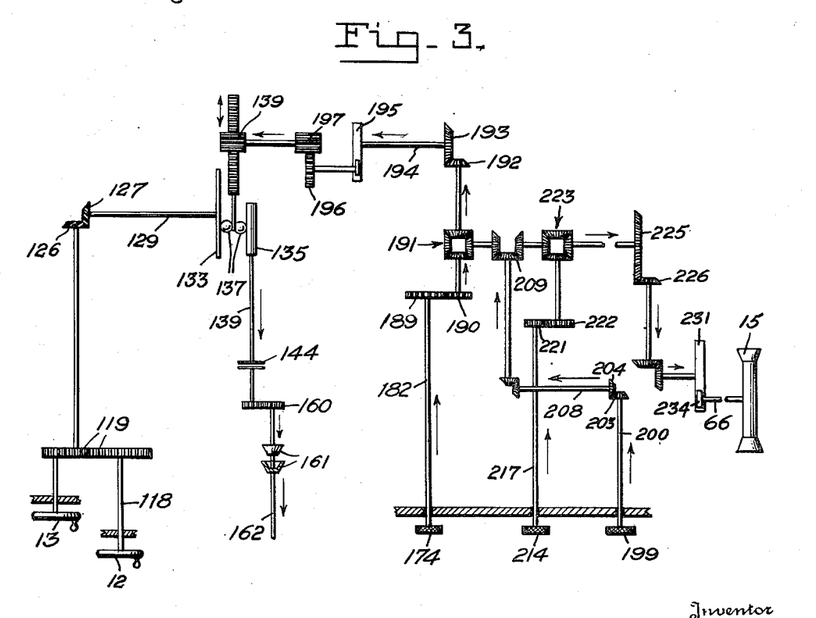
Figure 3 is a simplified diagrammatic view of the major parts of the computer and their connection with one of the two interconnected sights.

Figure 2 shows a standard 75 mm. gun mounted for training and elevation upon a standard gun motor carriage such as the Army's model M3 or M3A1. Hence it is sufficient, so far as the gun and its mount are concerned, to identify mounting frames 1 and 2 rigidly attached to the chassis of the motor carriage whose steering wheel is indicated at 3. The gun 4, is mounted in the cradle 5 having trunnions journaled by bearings 6 and 7 rigid with the upper gun carriage. Elevation of the gun is effected by operation of either of handwheels 8 or 9 fixed to a common shaft 10. This shaft drives a pinion, not shown, in mesh with the elevation section sector 11 secured to cradle 5 concentric of the trunnion axis. The upper carriage is pivoted on a normally vertical axis on the mounting frame or lower carriage, of which 1 and 2 are parts. Movement of the gun in train is effected by operation of handwheels 12 and 13 which drive a pinion on the upper carriage, not shown, in mesh with a gear sector concentric of the train axis and fixed to the lower carriage. Usually, the gun is trained by a trainer who grasps handwheel 12 while looking through telescope 14, and elevated by a pointer who grasps handwheel 9 while looking through a second telescope 15. At times, both training and elevation may be effected by the operator at telescope 14, through handwheels 8 and 12.

Figures 5, 7:
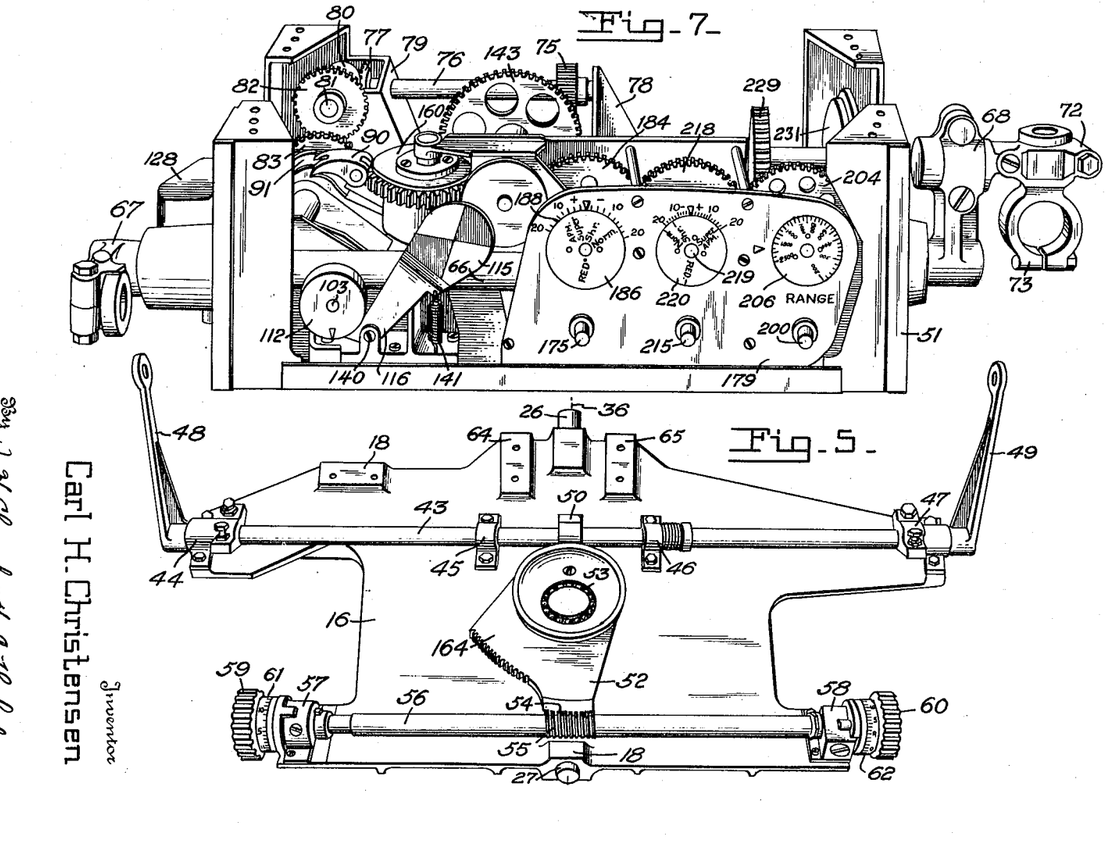
Figure 5 is a perspective view of the base or cant plate by which the sights and computer are adjustably mounted upon the gun carriage and showing the starting levers and lateral spot correction adjusting means.
Figure 7 is a perspective view of the front of the computer case, with top, side and end plates removed to more clearly show details of construction and relation of the parts.

The cradle 5 on its top surface, carries bearings which define an axis parallel to the gun bore. As seen in Figure 5, a base or cant plate 16, has aligned bearing studs 26 and 27 journaled in the aforesaid bearings, whereby the plate may be cross leveled about the axis thereof, that is to say, about an axis parallel to the gun bore. The cant plate 16 is tilted by means shown at Figure 9 as consisting of a bracket 17 attached to a bearing pad 18 of plate 16. A sleeve 19 has its upper flattened, apertured end fitting between a forked bearing 20 on bracket 17. The sleeve is pivoted in the bearing by a pin 21 and, at its lower end, carries a nut member 22 threadedly engaging a screw 23. This screw is connected by a universal joint 39 with a shaft 40 which, in turn, is pivoted in a bracket 25 that may be attached to the gun cradle. A bevel gear 24 is fixed to shaft 40 and meshes with a crown gear 41 journaled in bracket 42.

A sleeve 28 is connected at its upper end by universal joint 29, with gear 41. A splined rod 30 slides within sleeve 28 and is prevented from rotation relatively thereto, by any suitable means such as a pin in the end of the sleeve projecting into the spline of rod 30. This rod is connected at its lower end with a shaft 31, by means of a universal joint 32. The shaft 31 is journaled in a bearing carried by a bracket 33 and is connected for rotation by a handwheel 34, through bevel gearing 35. By the use of further shafts and gearing handwheel 34 may be located at any other convenient position on the vehicle and when turned, acts to rotate screw 23 and thus cause sleeve 19 to move axially therealong, thus effecting pivotal movement of plate 16 about the axis 36 of studs 26 and 27. At the same time, the gun may be trained and elevated throughout its permissible range of movements relatively to the vehicle, without interference from the cross-leveling control. As shown upon Figure 2, a curved bubble tube level 37 is carried upon a bracket 38 fixed to cant plate 16. In use, handwheel 34 is rotated until the bubble of level 37 is centered, at which time it is known that all lines in plate 16 normal to axis 36, are horizontal. The cross-leveling mount and operating means therefor, in the installation shown, are effective to rotate the cant plate through angles of 15° each way with respect to the gun trunnion axis.

A starting shaft 43 is journaled in bearings 44 to 47, inc., fixed to plate 16. The shaft projects from each side edge of the plate and has handles 48 and 49 fixed thereto. As will be subsequently described, when either of levers 48 and 49 is grasped and pulled back, a lever or latch 50 fixed to shaft 43 is operated, and acts at one and the same time to wind a spring mechanism from which the computer obtains its motive power, and to start the four-second timing period previously mentioned.

The computer and sights in general

Figure 8:
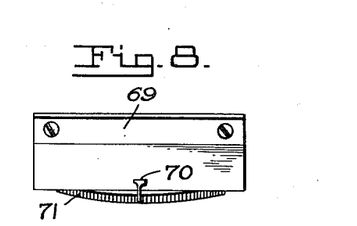
Figure 8 is a detail view of the spot connection indicator.

The computer mechanism proper, is positioned within a generally rectangular frame within a case 51 that is pivoted on plate 16 on an axis normal to said plate. A gear sector 52, Figure 5, is journaled on plate 16 by anti-friction bearing 53 and has teeth 54 thereon, in mesh with a worm 55 fixed to shaft 56. This shaft is journaled in bearings 57 and 58 carried by plate 16 and has knobs 59 and 60 fixed to its projecting ends. Each knob carries a respective spot correction scale 61 and 62, each scale being readable against a mark on the adjacent portion of the bearing. The case 51 is attached to and supported by sector 52 so that, as the sighting telescopes are carried by the case, in a manner subsequently described, rotation of either knob 59 or 60 effects spot corrections in azimuth, by rotating the case and telescopes relatively to plate 16. From Figures 2 and 8, it will be noted that a plate 69 is secured to the front wall of the case at the lower central edge thereof, bearing an indicator 70 which moves adjacent a spot deflection scale 71 fixed to cant plate 16, and graduated over a range of about 18 mils on each side of a zero graduation. Scale 71 is concentric of the axis of bearing 53.

A bracket 63 is attached to bearing pads 64 and 65, integral with base 16. This bracket extends up over the top of casing 51, as shown upon Figure 2, and carries a bearing, not shown, in alignment with bearing 53 to thereby steady the movement of case 51 about the deflection axis defined by the aligned bearings.

The telescope carrying shaft 66 is mounted by the end walls of the casing 51 and projects therefrom at each end. At the left end, as seen in Figure 7, shaft 66 mounts a telescope bracket 67 clamped to the end of shaft 66 and provided with an arm having an aperture in its end parallel to shaft 66. A standard M19 telescope mount is adapted to be clamped in this aperture. This mount, which forms no part of my invention, has a socket within which a portion of the telescope is clamped, together with a slow motion adjustment eccentric by which the optical axis of the telescope 14 may be given a bore sighting adjustment about an axis normal both to the optical axis of the telescope and to shaft 66. Telescope 14 may be a standard Army T-55 model.

At the other end, shaft 66 carries a second bracket 68, which may be identical with 67 but having its arm at right angles to that of 67. An arm 72 is fixedly carried by bracket 68 to extend parallel to shaft 66. A telescope clamp 73 is mounted at the end of arm 72 for pivotal movement through a small angle about an axis normal both to shaft 66 and the optical axis of the pointer's telescope clamped therein. This adjustment is for bore sighting. Telescope 15 may be a standard Army T-84 model.

The timing mechanism

The starting levers 48 and 49 and their common shaft 43 have previously been described. To avoid confusion, but one lever, 49, is shown upon Figure 4. As this lever is pulled back, it moves the end of latch 50 upwardly and effects translation of a rack 74 which, in turn, rotates a pinion 75 fixed to a shaft 76 journaled in brackets 78 and 79 affixed to the casing frame 51. See Figure 7. A bevel gear 77 is fixed to the outer end of shaft 76 and meshes with a bevel gear 80 mounted on one end of a short shaft 81. This shaft has a gear 82 fixed on its other end meshing with a gear 83 fixed to a shaft 84. Shaft 84 extends through a hollow shaft or sleeve 89 and at its end opposite gear 83 carries a pawl 90 held by a spring, not shown, in contact with a ratchet wheel 91. Wheel 91 is fixed to one end of sleeve 89, the other end of which has a gear 85 fixed thereto. This gear drives a pinion 86 mounted on a sleeve or hollow shaft 87. Shaft 87 extends into casing of spring motor 88 and is there connected to one end of the main spring to wind the same in a manner well known in the art. Shaft 84 at its end opposite gear 83 (see Figure 10), projects beyond sleeve 89 and there has a crank arm 92, carrying a pin 93. The ends of a double lever having parallel arms 94 and 95 rest on pin 93. The arms are pivoted on a shaft 96 and connected by a pin 97. Adjacent their fulcrum at 96, the arms are notched and engage pins 98 and 99, respectively, of a clutch-actuating device 100 whose purpose and function will be subsequently described.

Figures 9, 10:
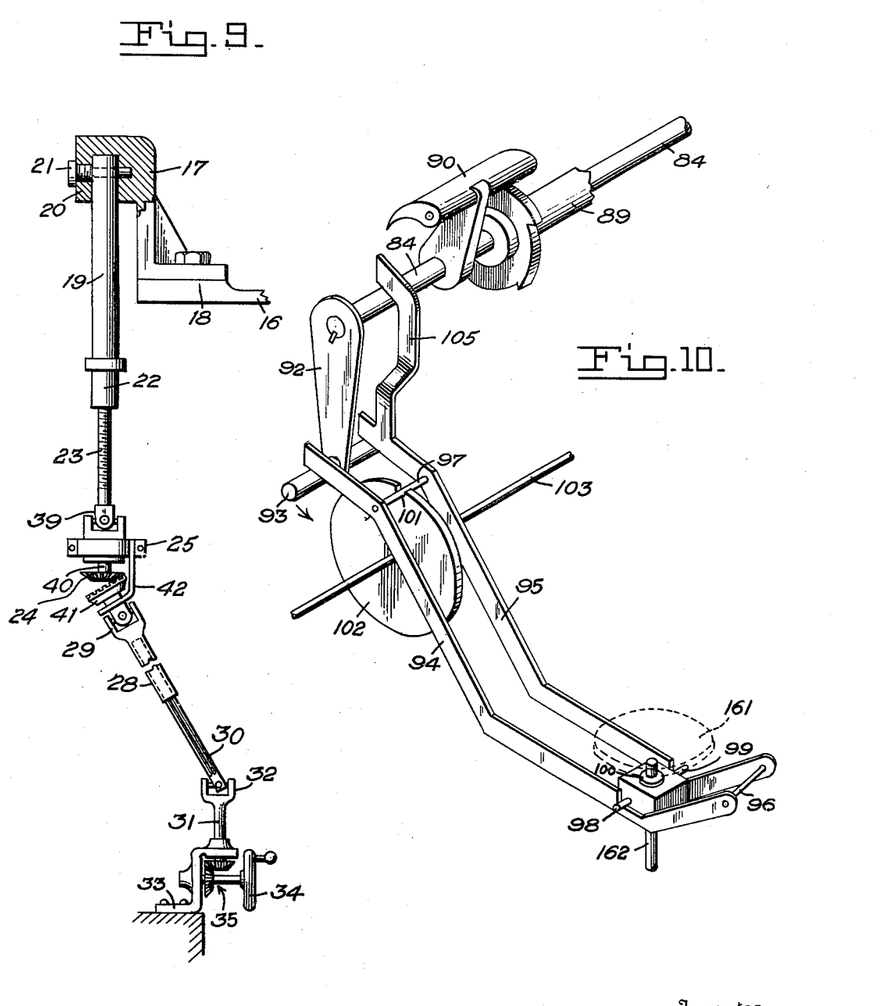
Figure 9 is a schematic detail view of the cross-leveling adjusting feature.
Figure 10 is a schematic view showing to an enlarged scale the time-controlled clutch-operating mechanism.

In the position shown at Figure 10, the pin 97 rests within a radial notch 101 provided in a wheel 102 to thereby prevent rotation of the wheel and the shaft 103 to which it is fixed. As seen from Figure 4, shaft 103 is coaxial with and extends through tube 87. As lever 48 or 49 is pulled backwardly, in addition to the winding of the spring of motor 88 through pawl and ratchet 90, 91, arm 92 is rotated in the direction of the arrow, Figure 10, and acts to raise pin 97 out of notch 101 to thereby release wheel 102 and permit rotation of shaft 103, for a purpose to be subsequently described. At the same time, device 100 is raised to close a cone clutch 104 and thereby connect the gun training mechanism with the drive displacing the computer and sights relatively to cant plate 16, all as will be subsequently described.

Figure 4:
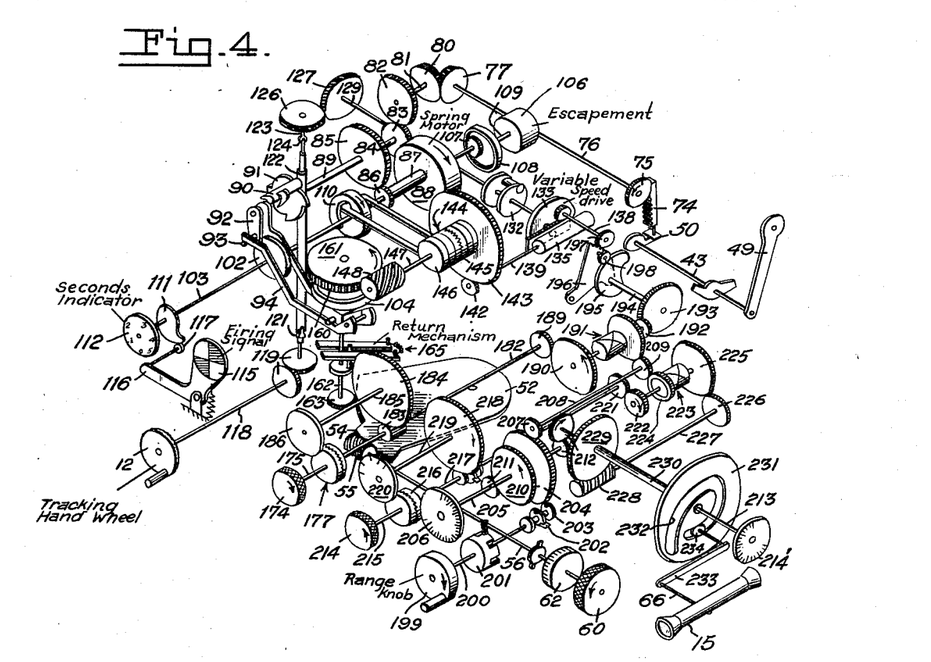
Figure 4 is a schematic lay-out of the complete computer, its connection with the sights and showing the several release clutches, the timing mechanism, starting lever, and manual adjustments.

The shaft 103 is connected to be urged toward clockwise rotation, as seen in Figure 4, by the spring of motor 88. This rotation, when permitted by removal of pin 97 from slot 101, is regulated by an escapement 106 which may be of any well-known type and connected with shaft 103 by a pinion 107 on the shaft, in mesh with an internal gear 108 fixed to a shaft 109 of the escapement. The escapement is so adjusted and regulated that shaft 103 makes a complete rotation in exactly six seconds.

In addition, shaft 103 carries a disc clutch control cam 110, a firing signal cam 111 and, on its end adjacent the instrument board of case 51, a seconds indicator 112. This indicator appears through a window 113 in the instrument board as seen at Figure 2. A window 114 is formed in the instrument board in the path of movement of a firing signal 115. From Figure 7, it will be noted that this signal is carried at one end of a bent arm 116, pivoted at 140 on a bracket affixed to the floor of the casing. The other end of the arm has a roller 117 that is held in contact with cam 111 by means of a spring 141. The arrangement is such that, six seconds after shaft 103 has been released, roller 117 drops off the riser of cam 111 and permits spring 141 to move the disc 115 into view through window 114 to thereby indicate that the gun is in firing position.

Thus it will be noted that a pull on either lever 48 or 49 at once winds the spring motor and releases the timing mechanism of which such motor forms a part.

It is assumed that, at the time lever 48 or 49 is pulled, the lines of sight of both telescopes 14 and 15, are on the target by reason of the trainer operating his handwheel 12 or 13, and the pointer, his handwheel 9. The operation of the handwheels is continued during the timing interval and until the gun is fired.

The computer proper

Figure 6:
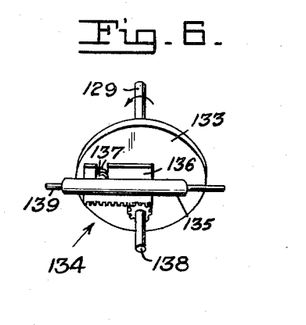
Figure 6 is a detail perspective view of a suitable variable speed device employed as an element of the computer.
Figure 11:
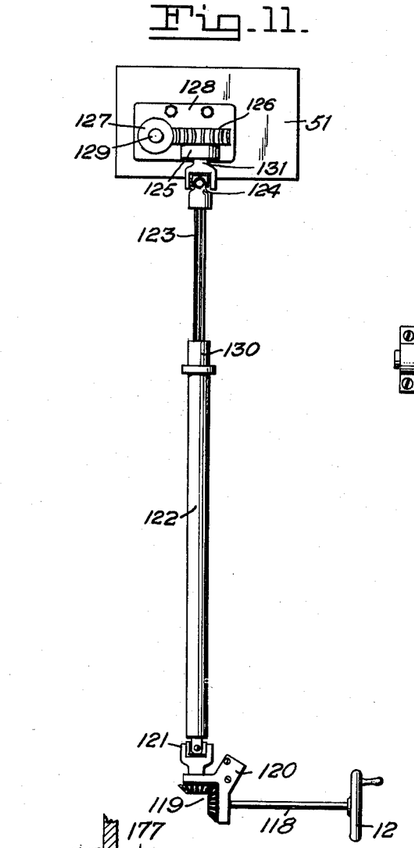
Figure 11 is a detail view to an enlarged scale of the tracking handwheel of the gun and the driving connection therefrom to the computer.

As well shown at Figure 11, rotation of training handwheel 12 drives a shaft 118 and thereby a pair of intermeshing bevel gears 119, the final one of which is fixed to one section of a universal joint 121. Gears 119 may be journaled in a bracket 120 attached to the upper gun carriage. The other section of joint 121 is carried by the lower end of a tube 122, having a splined nut 130 at its upper end. A splined shaft 123 fits nut 130 and tube 122 and carries at its upper end the lower section of a universal joint 124. The upper section of joint 124 is attached to a short section of shaft 131 journaled in bearing 125 of a bracket 128, attached to the adjacent end plate of case 51. A spiral gear 126 is attached to shaft 131 and meshes with a gear 127 fixed to a shaft 129 having one end journaled in bracket 128 and extending longitudinally along and within case 51 to drive the disc element 133 of a standard disc-and-roller type of variable speed drive 134. A coupling 132 is interposed in shaft 129 between gear 127 and disc 133. As shown in Figure 6, the variable speed device consists of driving disc 133, a driven roller 135 extending diametrically across disc 133, and a cage 136 guiding a pair of balls 137 radially of the disc and in contact with the disc and roller, respectively, and with each other. Translation of the ball carriage 136 is effected by rotation of shaft 138 having a pinion in mesh with a rack on carriage 136. Thus, for a given speed of rotation of disc 133, the speed of roller 135 and its shaft 139 will be directly proportional to the radial position of balls 137 from the center of disc 133.

Figure 12:
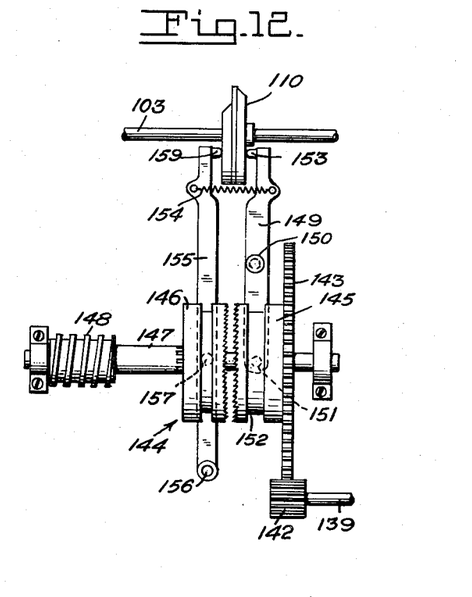
Figure 12 is an enlarged detail view of the disc and the time-controlled cam for opening and closing the same.

Shaft 139, driven by roller 135, carries a pinion 142 in mesh with a gear 143 affixed to one portion of a disc clutch indicated generally at 144, Figure 12. This clutch comprises two portions 145 and 146, having mating clutch teeth adapted to be engaged and disengaged by relative translation along the axis of a shaft 147. Clutch portion 145 is shown connected with gear 143, pinion 142 being elongated so that it is continuously in mesh with gear 143. Clutch portion 145 is journaled on the smooth reduced end of shaft 147 while portion 146 is splined upon the end of shaft 147 of larger diameter. A worm 148 is fixed to this end of the shaft.

Sliding of portion 145 is effected by a lever 149 fulcrumed at 150 and having at one end a pin 151 fitting a circumferential channel 152 in portion 145. The other end of lever 149 has a follower 153 which is held in contact with one face of cam 110, by a spring 154 having its other end connected to a lever 155. This lever is fulcrumed at 156 and has a pin 157 fitting circumferential slot 158 of clutch portion 146. A follower 159 on lever 155, engages the face of cam 110 opposite follower 153. The construction of cam 110 is such that, at the end of the first second after shaft 103 is released, portion 146 is moved into engagement with portion 145 to thereby effect a drive from shaft 139 to worm 148 while, at the end of the fifth second, portion 145 is shifted to again open the clutch. In other words, during operation, clutch 144 remains closed for four seconds only for each cycle.

Worm 148 drives a gear 160 connected with one portion of a cone clutch 161. This portion is rotatably mounted coaxially with a shaft 162 upon which the lower portion of clutch 161 is splined. The aforesaid lower clutch portion is swiveled to block or clutch actuating device 100, appearing in Figure 10 and the arrangement is such that clutch 161 is closed by movement of levers 94 and 95 to retract pin 97 from notch 101 and, of course, opened again as soon as pin 97 drops into notch 101, six seconds later. Shaft 162 has a pinion 163 upon its lower end in mesh with a gear segment 164 formed on sector 52. See Figure 5. Thus, rotation of pinion 163 causes it to walk around segment 164, and revolve telescopes 14 and 15 relatively to plate 16, about the axis of bearing 53.

Figure 13:
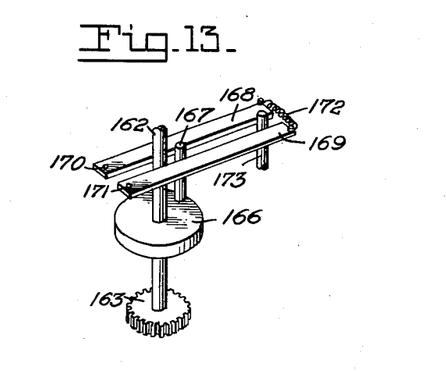
Figure 13 is an enlarged detail view of the mechanism for returning the computer and sights to centralized or undeflected position relatively to the gun.

Mechanism is provided to return the casing and telescope to undeflected position wherein the lines of sight of the telescopes are parallel to the vertical plane through the gun bore, when clutch 161 is opened. This mechanism is indicated generally by the numeral 165, Figure 4, and is shown in detail at Figure 13, as comprising a disc 166 having a crank pin 167 extending between two normally parallel levers 168 and 169 pivoted at 170 and 171 to a part, not shown, fixed to the instrument casing 51. A spring 172 connects the free ends of the levers and urges them into engagement with a pin 173 also fixed to the casing. Thus, when shaft 162 rotates in either direction, one of the levers is pivoted against the tension of spring 172. Since the maximum angle of rotation of shaft 162 is small, the mechanism just described, acts in an obvious manner, to return the parts to the position shown at Figure 13, wherein shaft 162 and pins 167 and 173 are coplanar, when clutch 161 is opened. It should be noted that, because of the irreversible drive between gear 160 and worm 148, the return mechanism is ineffective so long as clutch 161 is closed even although clutch 144 is open. Hence, any lead introduced by the computer between the gun and line of sight, remains in the instrument until clutch 161 is opened by pin 97 dropping into notch 101.

Since the lead angle is proportional to target travel during time of flight of the projectile, the angular rate of the line of sight in tracking the target, must be modified by the time of flight. This time is substantially and directly proportional to the range of the future or predicted target position and inversely proportional to the average velocity of the projectile; and for any given gun, the average projectile velocity will be proportional chiefly to the type and amount of propellant used.

Consider a target moving at constant speed directly across the line of sight. Then, obviously, the angle subtended at the gun by the distance traveled by the target during, say, one second, varies inversely with the range of the target. Hence, in using angular tracking rates as criterions of target speed, it is necessary first to modify such rates in accordance with range. On the other hand, the lead angle, is the product of target speed and time of flight; and time of flight is generally proportional to range. This is apparent from Equation 5 where it will be noted that "$t$" occurs in both the numerator and denominator of the right-hand side.

Figure 14:
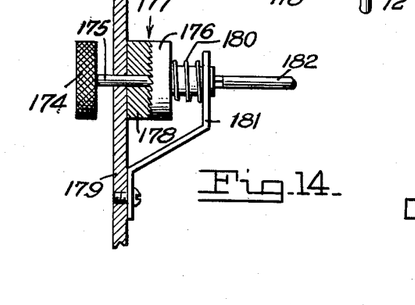
Figure 14 is a detail sectional view to an enlarged scale, of the means for releasably securing the time of flight shaft in adjusted position.

In my invention, I prefer to introduce the time factor, modified by type of propellant, by adjustment of the ball cage of variable speed drive 134. Referring to Figures 4 and 14, a time of flight knob 174 is fixed to a shaft 175 projecting through the panel of the casing 51, and is attached to the rear toothed element 176 of a line lock indicated generally at 177. The forward element 178 of the lock is affixed to the panel plate 179. A spring 180 surrounds a sleeve portion of element 176 and is compressed between said element and a bracket 181 attached to panel 179. The aforesaid sleeve portion has a squared aperture fitting over the squared end of a shaft 182, also shown in Figure 4. Hence, knob 174 and shaft 182 are normally locked against rotation but may be rotated by first pressing knob 174 inwardly to separate toothed element 176 from 178 against the action of spring 180.

A pinion 183 is fixed to shaft 182 and meshes with a gear 184 mounted on shaft 185. This shaft carries a dial 186 visible through window 187 in casing 51. See Figure 2. As seen in Figure 7, dial 186 has graduations about its periphery for different velocities of projectile. For example, the dial of the model shown has successive indicators marked "APM61," "Super," "Shrap." "Norm." and "Red." corresponding respectively to the velocities of armor-piercing shell, type M61, super-velocity for an augmented charge of propellant, shrapnel shells, shells with normal charge and reduced charge. Thus, in setting, the dial is rotated until the mark corresponding to the velocity of the particular type of shells being used, is opposite the time of flight on scale 188 formed on panel plate 179. The setting is effected relatively to the "plus" or "minus" sections of the scale, depending upon whether the target is proceeding left to right, or right to left.

Shaft 182 carries a gear 189, meshing with a larger gear 190 which, in turn, drives one side of a differential 191. The center of differential 191 is connected to drive a spur gear 192, in mesh with a larger spur gear 193 fixed on shaft 194. This shaft also carries a time of flight cam 195. A gear sector 196 meshes with and drives a pinion 197 fixed on shaft 138. This shaft, it will be remembered, adjusts the ball cage of variable speed drive 134. A follower 198 is carried by sector 196 and is held in engagement with cam 195 by spring means, not shown, acting upon sector 196.

A range knob 199 is shown at Figures 2 and 4, mounted upon a shaft 200 and equipped with a spring detent 201 by which the knob may be rotated in steps by "feel."

The shaft is provided with a limit stop device 202 of well-known construction, limiting the shaft to a predetermined number of turns, eight in the model illustrated. A pinion 203 on shaft 200, drives a gear 204 fixed on shaft 205. This shaft projects through panel 179 and there carries a dial 206 graduated in terms of range and observable through window 187, Figure 2.

Gear 204 drives a pinion 207 mounted on shaft 208 which carries a second pinion 209 driving the second side of differential 191. Thus the center of said differential as well as cam 195, are driven in accordance with the algebraic sum of the rotation of knobs 174 and 199. A second gear 210 is fixed to shaft 205 and drives a pinion 211 fixed on the same shaft with one of a pair of spiral gears 212. The other spiral gear drives a shaft 213 which projects through the right end wall of casing 51 and there carries a second range dial 214' which may be a duplicate of dial 206 so that knob 199 may be adjusted from the right side of the gun.

An elevation knob 214 is mounted at the panel 179, between knobs 174 and 199, and is carried by a shaft 215. This shaft is coupled by a line lock device 216, similar to the one shown in Figure 14, with a coaxial shaft 217 having a pinion thereon in mesh with a gear 218 that, in turn, is fixed to a shaft 219. This shaft carries a dial 220 at its end projecting through plate 179. This dial may be graduated similarly to dial 186, that is, in accordance with velocities of different types of ammunition used in the gun.

Shaft 217 has a limit stop device limiting its rotation to, say, four rotations for a complete traverse of dial 220. Shaft 217 extends rearwardly where it carries a pinion 221, in mesh with a pinion 222 which drives one side of elevation differential 223. The other side of this differential is connected with a pinion 224 in mesh with pinion 209, previously described as being driven by actuation of range knob 199. The center of differential 223 is connected with a gear 225 in mesh with a gear 226 fixed to shaft 227. This shaft also carries a worm 228 which drives a gear 229 fixed to one end of a hollow shaft 230 and through which, shaft 213 passes.

Elevation cam 231 is fixed upon the other end of shaft 230 and has a cam groove 232 formed therein. Pointer's telescope 15 and shaft 66 upon which it is mounted, have previously been described. Although shaft 66 extends longitudinally of casing 51 and projects through each end thereof to carry the adapters for both sights, it is shown in Figure 4 as a short section, to avoid excessive and confusing lines. A lever 233 is attached to shaft 66 and at its outer end carries a follower 234 riding in slot 232. By the foregoing construction, cam 231 is rotated in proportion to the algebraic sum of the rotations of range knob 199 and elevation knob 214, to thereby cause the lines of sight of both telescopes 14 and 15 to move angularly about the axis of shaft 66. Figure 4 has been simplified considerably by omitting training handwheel 13, one starter lever, one lateral spot correction dial and knob, and telescope 14. In the model of the two range knobs illustrated, shaft 200 extends through both walls of the casing, and is provided with a knob at each end. The knob at the forward side of the casing has also been omitted upon Figure 4.

From the foregoing description, it will be noted that the computer consists essentially of a variable ratio transmission between the telescope mount and the traverse handwheel. When the computing mechanism is engaged by closure of the clutches under control of the timing mechanism, displacement of the traverse or training handwheel causes the telescope to be rotated with respect to the gun in a direction opposed to the principal motion of the gun and sights whereby the telescope lags behind the gun and, in being maintained directed upon the target, causes the gun to be advanced ahead of the target by the correct lead angle for the conditions extant, that is, by an amount proportional to the product of training handwheel displacement and the transmission ratio set into variable speed drive 134, by cam 195. This ratio is set by cam 195 to represent time of flight. From Equation 5 it will be noted that the lead angle L is independent of the rate of training during the selected time interval. Hence, velocity errors in tracking are of no consequence provided the mean error is zero. This condition is satisfied if the trainer is on target at both termini of the computing interval or if the two terminal position errors are identical.

Operation

The operation will be described on the basis of a full crew of four men, viz., a chief of section, driver, trainer and pointer. The chief designates the target, determines the range for the first round, and sets the range knob 199. The driver, during firing, is required to maintain the cross-level centered by operation of handwheel 34, located adjacent his position. The trainer sets the time of flight and elevation dials 186 and 220, by operation of knobs 174 and 214, until they indicate the velocity of the ammunition being used. Before the engagement starts and during the same, the trainer looks through telescope 14, and operates handwheel 12 or 13, to keep his line of sight upon the target. The pointer sits on the right side of the gun and, looking through telescope 15, operates elevation hand wheel 9 to keep his line of sight upon the target.

With all men at their stations, the chief selects and identifies a target, and operates handwheel 199 to adjust dial 206 for the range he has determined or estimated. The trainer sets dials 186 and 220 for the type of ammunition being used, and then operates his hand wheel to train the gun and sight until the line of sight is on the target. The setting of range handwheel 199 has operated through shaft 200, gears 203, 204 and 207, shaft 208, gears 209 and 224, differential 223, gears 225 and 226, shaft 227, worm 228, gear 229, and hollow shaft 230, to rotate cam 231. The rotation thus imparted to the cam is modified in accordance with the velocity of the ammunition being used by operation of knob 214, shafts 215 and 217, gears 221 and 222 to differential 223, thence over the drive from gear 225, as previously traced.

The foregoing adjustments rotate telescopes 14 and 15 as a unit, by way of roller 234, lever 233 and shaft 66 to depress their lines of sight as a unit relatively to the gun. In operating his handwheel 9 to restore the line of sight of his telescope 15 upon the target, the pointer elevates the gun to the proper elevation for the chosen range. Meanwhile, the trainer operates his handwheel 12 or 13, to direct the line of sight of his telescope 14 upon the target. At this time, of course, the lines of sight lie in respective vertical planes parallel to a vertical plane through the axis of the gun bore.

The previous setting of range handwheel 199 has adjusted ball cage 136 of variable speed drive 134 by way of the drive to gear 209 previously described, thence to one side of differential 191, gears 192, 193, shaft 194, cam 195, roller 198, sector 196, gear 197, and shaft 138. The radial adjustment thus imparted to the ball cage, is modified in accordance with the type of ammunition being used by way of knob 174, shafts 175 and 182, gears 189 and 190, to differential 191, thence over the drive previously traced, to carriage 136.

At a signal from the trainer that his line of sight is on target, the chief pulls either of levers 48 and 49 to thereby wind motor 88, release the timing mechanism, and close clutch 104 by raising lever 94. This clutch is then held closed for the six-second period, as pin 101 rides upon the periphery of rotating wheel 102. Shaft 103 now rotates and one second after it has been released, cam 110 acts to close clutch 144.

As clutch 144 closes, movement of handwheel 12, in addition to moving the gun in train, operates through shaft 118, gears 119, tube 122, gears 126 and 127, shaft 129, coupling 132, to drive disc 133 at a rate proportional to the angular rate of movement of the line of sight in azimuth. Ball carriage 136, having been adjusted in accordance with range, modified by the velocity of the projectiles being used, the drive proceeds to roller 135, shaft 139, gears 142 and 143, clutch 144, shaft 147, worm 148, clutch 161, shaft 162 and gear 163. Rotation of gear 163 causes it to "walk around" segment 164 and thus pivots the entire sight, relatively to the plate 16 and the gun, about the axis of bearing 53. The movement is such as to cause the sights to lag behind the gun so that, as the sights and gun are moved to maintain the former upon the target, the gun is advanced ahead of the target. At the end of five seconds after lever 48 or 49 has been pulled, and four seconds after clutch 144 has been closed, clutch 144 is again opened, to thus open the drive from handwheel 12 to gear 163. Because of the irreversible drive between worm 148 and gear 160, the return mechanism shown at Figure 13, cannot return the computer to initial or zero deflection position as long as clutch 161 is closed. Simultaneously with the opening of clutch 144, cam 111 is so positioned that roller 117 drops off the riser thereon, and spring 141 pulls firing signal 115 into view through window 114. At this instant, the lanyard 235 is pulled to fire the gun.

One second after clutch 144 opens, wheel 102 completes its rotation and pin 97 drops into notch 101, to open clutch 161. Return mechanism 165 is now free to return the sight casing to initial position wherein the sights are in vertical planes parallel to the vertical plane through the gun bore. The sights are thus directed so that the burst may be observed therethrough. The trainer indicates to the chief whether the burst is over or short of the target. The chief then operates handwheel 199 in the indicated direction by one "click" as determined by detent device 201 to thereby increase or decrease the range by approximately 4% (⅛ of a revolution of shaft 200). The trainer also notes whether the burst is right or left and turns knob 59 accordingly for a spot correction. Turning of knob 59 rotates the sector 52 and entire sight casing about the axis of bearing 53.

The trainer and pointer then again move their handwheels to re-align upon the target, the gun is reloaded, and the procedure just described is repeated until the target is destroyed or a new target is designated. During the firing, the driver adjusts his handwheel 34 to keep the bubble of level 37 centered. This adjustment acts to cross-level plate 16 about the axis of trunnions 26 and 27. Since this axis is elevated with the gun, errors that would otherwise be introduced because of tilt of the gun trunnions, are corrected, in the manner well known in the art. Because of the fact that the gun is given the proper lead during a predetermined fixed time interval, the rate or smoothness of tracking does not affect the accuracy of the results, so long as the sights are on target at the beginning and end of the four-second time interval.

While operation by a full four-man crew is preferable for maximum accuracy of fire, it is possible for one man at the trainer's station, to track both in elevation and azimuth by operation of auxiliary elevation handwheel 8. He could also make the necessary changes in range, observe bursts and perform all other necessary operations except cross-leveling. Hence the gun may be satisfactorily operated by a minimum crew of two, in event of casualties.

It will thus be seen that I have invented a computing gun sight that enables accurate firing upon a moving target, while, at the same time, being operable in the usual manner and without structural change, for firing at stationary targets. The sight is flexible in use, being operable by a crew of two to four, and is independent of tracking errors except at the start and end of the timing period. Furthermore, the computer is quite obviously, not limited to "on-carriage" mounting, but may be mounted apart from the gun and connected for movement therewith and relatively thereto by any well-known mechanical or electric telemetric transmitter and repeater systms.

The term "sight" or "sighting device," as used in the specification and claims, is to be interpreted broadly to include any known means for establishing or determining the instantaneous position in space of a line connecting the gun and target. In place of direct sighting, the use of radar or sound locators is contemplated.

While I have shown the preferred form of my invention as actually built and successfully tested, many modifications, alterations, rearrangements and substitutions will be obvious or occur to those skilled in the art of gun fire control. Therefore, I do not wish to be limited or restricted to the precise details of construction shown and it is intended that the foregoing disclosure shall be taken in an illustrative, rather than a limiting sense. Accordingly, I hereby reserve all such changes as fall within the scope of the subjoined claims.

Having now fully disclosed the invention, what I claim and desire to secure by Letters Patent is:

1. A computing sight for a gun having first means for angularly moving the gun in train, a line of sight device connected for movement with the gun in train, second means operative to angularly adjust said device relatively to the gun about an axis substantially normal to the bore axis of the gun, a drive from said first means to said second means including a clutch operable to connect and disconnect said drive, and, timing means operable to close said clutch and to open the same a predetermined time interval after closure.

2. A computing sight for a gun having training means operable to move the gun in azimuth, a line of sight device, computer means mounting said device on said gun and comprising a drive between said training means and said line of sight device, said drive being operable to adjust said device in azimuth relatively to said gun, a clutch in said drive operable to connect and disconnect said drive, a spring timing device operable to close said clutch and then open the same a predetermined time after closure, means normally locking said timing device against movement, and manually operable means effective to simultaneously wind said spring timing device and release said locking means.

3. In a rate-responsive sight for a gun having training mechanism operable to move the gun about a normally vertical axis, a sight pivoted on the gun for movement therewith, a connection between said sight and gun operable to adjust said sight relatively to the gun about an axis normal to the bore axis of the gun, a drive from said training mechanism to said connection and including a clutch and a variable speed drive, in series, timing means operable to close and then open said clutch a predetermined time after closure to correspondingly connect and disconnect said drive, and means including a time of flight cam, operable to adjust the speed-varying element of said variable speed drive.

4. In a gun sight for a gun having training means operable to angularly move the same, a sight pivoted on said gun, drive means operable to so pivot said sight relatively to said gun, in response to operation of said training means, said drive means including a clutch, a spring motor, means operable by said motor to open and close said clutch, a stop for said motor, a handle, and means operated by said handle to simultaneously wind the spring of said motor and render said stop ineffective.

5. In a computing, on-carriage gun sight for a gun elevatable on an upper carriage which is trainable on a lower carriage, a cant plate directly pivoted on the gun on a first axis parallel to the bore thereof and parallel with the plane of said plate, manually operable connections between said plate and upper carriage to so pivot said plate, a computer casing pivoted on said plate on a second axis normal to said plate and concurrent with said first axis, a sight pivoted on said casing on a third axis normal to said first and parallel with said plate, said sight establishing an external line of sight normal to said third axis, computer means in said casing and including a variable speed drive, a driving connection to said variable speed drive responsive to angular train movement of the gun and upper carriage relatively to the lower carriage, means including clutch means operated by said variable speed drive to pivot said casing about said second axis, and time-controlled means operable to connect and disconnect said clutch means.

6. In a computing gun sight, a cant plate, a sector and a computer, pivoted on a common axis normal to said plate, first means automatically operable by said computer and engaging said sector to rotate said computer about said axis relatively to said sector, second means connecting said sector and cant plate and operable to angularly adjust said sector and computer as a unit about said axis relatively to said plate, sighting means carried by said computer and means for mounting said plate upon a gun for pivotal movement about an axis parallel to the bore thereof.

7. The sight as in claim 6, said sector having first and second gear segments, said first means comprising a pinion rotatable on and by said computer and in mesh with said first gear segment, and said second means comprising a shaft journaled on said cant plate and a worm on said shaft in mesh with said second gear segment.

8. In a computing gun sight, a cant plate adapted to be mounted upon a gun for pivoting about a first axis parallel to the bore axis of said gun, a sector mounted on said plate for pivotal movement about a second axis perpendicular to said plate and having first and second gear segments thereon, a casing pivoted on said plate concentric of said second axis, a sight carried by said casing with its optical axis normally parallel to said first axis, computer means carried by said casing, a connection between said computer means and sector including a rotatable pinion on said casing in mesh with said first gear segment, and a connection between said sector and cant plate including a worm rotatably carried by said plate and in mesh with said second gear segment.

9. In a gun fire computer, an output shaft, a first clutch connected to drive said shaft, a second clutch, an irreversible drive from said second clutch to said first clutch, a variable speed device having its output element connected to drive said first clutch through said second clutch and irreversible drive, means for driving said variable speed device by and in proportion to angular movement of a gun, timing means, and means operated by said timing means to open and close said clutches in predetermined sequence.

10. In a gun fire computer, an output shaft, a variable speed device, a pair of clutches, an irreversible drive connecting said clutches in series, a first drive from said variable speed device to one said clutch, a second drive from the other said clutch to said shaft, a timing device, means operated by said timing device to open and close said clutches in predetermined sequence, a sight angularly movable with a gun and pivotal with respect thereto, means operated by said output shaft to so pivot said sight relatively to the gun, and means driving said variable speed device in response to angular movement of said gun to maintain said sight upon a target.

11. In a sighting system for guns, a sight adapted to move angularly with a gun about a predetermined first axis and pivotally adjustable relatively to said gun from a predetermined normal relation about a second axis substantially normal to said first axis, first means including a shaft for effecting pivotal movement of said sight relatively to said gun about said second axis, yielding means urging said first means and sight into said normal relation with respect to said gun, means for driving said shaft including first and second clutches connected in series by an irreversible drive, and a drive operating said second clutch by and in proportion to the angular movement of said gun to maintain said sight upon a target, a timing device, means operated by said timing device to close said first clutch, close said second clutch, open said second clutch and then open said first clutch in timed sequence whereby said sight is angularly moved relatively to said gun during the interval said second clutch is closed, said yielding means restoring said sight to said normal relation on opening of said first clutch.

12. In a computing sight for a gun mounted for elevation on a first axis on a carriage trainable about a second substantially vertical axis, a computer pivoted on said gun on a third axis normal to said first axis, a sight carried upon said computer normally parallel to the bore axis of the gun, drive means responsive to the angular movement of said gun in maintaining said sight upon a target and effective to drive said computer, means operated by said computer to angularly move said computer and sight relatively to the gun about said third axis, said drive means including first and second clutches and an irreversible drive connecting said clutches, said computer including timing means, and means controlled by said timing means to close said first and second clutches in the order mentioned and, after a predetermined time interval, to open said second clutch.

13. In a computing sight for a gun mounted for elevation on a first axis on a carriage trainable about a second substantially vertical axis, a computer pivoted on said gun on a third axis normal to said first axis, a sight carried upon said computer normally parallel to the bore axis of the gun, drive means responsive to the angular movement of said gun in maintaining said sight upon a target and effective to drive said computer, means operated by said computer to angularly move said computer and sight relatively to the gun about said third axis, said drive means including first and second clutches and an irreversible drive connecting said clutches, and a variable speed drive having its output connected to drive said second clutch, said computer including timing means, means operated by said timing means to close said first and second clutches, then open said second and first clutches in predetermined timed sequence, in the order mentioned, said computer including a cam, a connection between said cam and variable speed drive, and means operating said cam in accordance with range of a target and the time of flight of a projectile from the gun to the target.

14. That method of aiming a gun at a moving target comprising, moving as a unit said gun and a sight mounted thereon, to maintain said sight on the target for a predetermined fixed time interval, measuring the total angle moved by said gun during said interval to obtain a measure of the average apparent angular rate of said target, multiplying said rate by the time of flight of a projectile from said gun to the target to obtain a resultant lead angle, and progressively retarding the angular movement of the line of sight relatively to said gun by said resultant lead angle during said time interval, whereby at the end of said time interval said gun is advanced ahead of said line of sight by said resultant lead angle.

15. That method of aiming a gun at a moving surface target, comprising, moving said gun in train at the rate necessary to maintain directed upon the target for a predetermined fixed time period, a line of sight moving as a unit with said gun, measuring the total angle of movement of said gun during said period to obtain the time integral of the apparent average angular rate of movement of said target during said period, multiplying said rate by the time of flight of a projectile from said gun to the target to obtain a resultant lead angle, and continuously and progressively retarding the angular movement of said line of sight relatively to said gun so that said gun is advanced in train ahead of said target by said lead angle at the end of said time period.

16. The method of firing at a moving surface target, comprising, moving a gun and sight therefor as a unit in train, and for a predetermined fixed time period, to maintain the line of sight of said sight upon said target, said line of sight having an initial position at the beginning of said period in a plane parallel to the vertical plane through the bore axis of said gun, measuring the total angle of movement of said gun during said period to obtain the apparent average angular rate of movement of said target during said period, multiplying said rate by the time of flight of a projectile from said gun to the target to obtain a resultant lead angle, continuously and progressively retarding the angular movement of the line of sight relatively to said gun so that said gun is advanced in train ahead of said target by said lead angle at the instant said period ends, firing the gun at said instant, and instantaneously advancing said sight to said initial position relatively to said gun to observe the position of the burst of said projectile relatively to said target.

17. In a computing sight for a gun mounted for pivotal movement about mutually normal train and elevation axes, said sight comprising a casing mounted for movement as a unit in train with the gun and adapted for pivotal movement relatively to the gun about a deflection axis normal to the elevation axis of the gun, means responsive to angular movement of the gun in train to pivotally move said casing relatively to the gun about said deflection axis, said means comprising a variable speed drive and a clutch, timing means, and means controlled by said timing means to close said clutch and open the same a predetermined fixed time after closing, a telescope pivoted on said casing on a normally horizontal axis perpendicular to the line of sight of said sight, a cam in said casing and rotatable to pivot said telescope relatively to the casing, and a single range set carried by said casing and operable to simultaneously adjust said variable speed drive and to rotate said cam.

18. A gun sight as recited in claim 17, said timing means comprising a spring motor, and manually operable means to wind said motor and then release said timing means.

19. In a computing gun sight adapted to be mounted upon a gun having training means, a frame pivoted on said gun for movement about a first axis normal to the bore of said gun and lying substantially in a vertical plane through said bore, first and second telescopes pivoted in said frame on a normally horizontal second axis, a drive including a variable speed device and a clutch, means driven by said clutch to pivot said frame and telescopes as a unit about said first axis relatively to said gun, means driving said variable speed device in response to operation of said training means, a timer connected to close said clutch and open the same a predetermined fixed time after closing, cam means operable to rotate said telescopes about said second axis relatively to said frame, first and second differentials, a drive between the center of said first differential, operable to adjust said variable speed device, means operable in accordance with projectile velocity to adjust one side of said first differential, a drive between the center of said second differential and said cam means, means operable in accordance with projectile velocity to adjust one side of said second differential and a common range set connected to simultaneously actuate the second sides of said first and second differentials.

20. That method of aiming a gun at a moving target comprising moving a line of sight and the gun angularly as a unit at a first angular rate necessary to maintain said line of sight directed upon the target, progressively retarding for a predetermined fixed time interval the angular movement of said sight relatively to the gun at a second angular rate proportional to a combined function of said first angular rate and range of the target, while maintaining the line of sight upon the target, to thereby advance the line of fire of the gun ahead of the target, and interrupting said retarding movement at the terminus of said time interval.

References Cited in the file of this patent

UNITED STATES PATENTS

| | | |
|---|---|---|
| 1,067,859 | Bacon et al. | July 22, 1913 |
| 1,412,758 | Sperry et al. | Apr. 11, 1922 |
| 1,424,594 | Schneider | Aug. 1, 1922 |
| 2,048,703 | Karnes | July 28, 1936 |
| 2,206,875 | Chafee et al. | July 9, 1940 |
| 2,363,523 | Greenblatt, Jr., et al. | Nov. 28, 1944 |
| 2,372,613 | Svoboda | Mar. 27, 1945 |
| 2,385,348 | Chafee | Sept. 25, 1945 |
| 2,403,117 | Peters | July 2, 1946 |
| 2,405,064 | Tear et al. | July 30, 1946 |
| 2,405,068 | Tear et al. | July 30, 1946 |
| 2,407,191 | Tear et al. | Sept. 3, 1946 |
| 2,534,225 | Brown | Dec. 19, 1950 |

FOREIGN PATENTS

| | | |
|---|---|---|
| 809,090 | France | Dec. 3, 1936 |
| 833,213 | France | July 18, 1938 |

OTHER REFERENCES

Ser. No. 374,007, Allec (A. P. C.), published April 27, 1943.

Ser. No. 313,395, Haubroe (A. P. C.), published May 4, 1943.